United States Patent Office 3,503,978
Patented Mar. 31, 1970

3,503,978
SUBSTITUTED, 2,4-DIOXODECA-
HYDROQUINAZOLINES
Adolf Zeidler, Ludwigshafen, Adolf Fischer, Mutterstadt,
Franz Reicheneder, Ludwigshafen, and Walter Him-
mele, Walldorf, Germany, assignors to Badische Ani-
lin- & Soda-Fabrik Aktiengesellschaft, Ludwigshafen
(Rhine), Germany
No Drawing. Filed Dec. 27, 1968, Ser. No. 787,612
Claims priority, application Germany, Dec. 27, 1967,
1,670,298
Int. Cl. C07d 51/48
U.S. Cl. 260—260  3 Claims

ABSTRACT OF THE DISCLOSURE

New and valuable substituted 2,4-di-oxodecahydro-
quinazolines and their use for controlling unwanted
plants, and having the formula

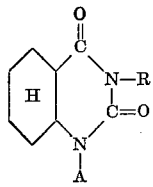
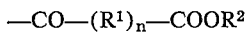

where R denotes an alkyl radical having from two to
four carbon atoms and A denotes the radical —CO—(R$^1$)$_n$—COOR$^2$ where R$^1$ denotes a linear or branched alkylene or alkyl-
ene group, a cycloalkylene group or an arylene group
which may bear halogen atoms or nitro, alkyl or alkoxy
groups as substituents, R$^2$ denotes an alkyl, cycloalkyl or
aryl radical and $n$ denotes zero or 1.

---

The present invention relates to new and valuable 2,4-
dioxo-decahydroquinazoline derivatives and herbicides
containing the same.

It is known that 3-isopropyl-2,4-dioxodecahydroquin-
azoline can be used as a herbicide (British patent specifi-
cation No. 1,035,093). Its effects are however not satis-
factory.

It is an object of the present invention to provide new
and valuable substituted 2,4-dioxodecahydroquinazolines.
Another object of the invention is to provide new and
valuable substituted 1-carbonyl-3-alkyl-2,4-dioxodecahy-
droquinazolines having good herbicidal properties. A
further object of the invention is a method of controlling
unwanted plants with the said active ingredients.

These and other objects and advantages of the inven-
tion are achieved by 2,4-dioxodecahydroquinazolines hav-
ing the formula

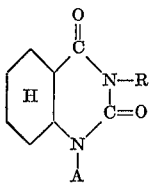
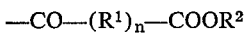

where R denotes an alkyl radical having from two to four
carbon atoms and A denotes the radical —CO—(R$^1$)$_n$—COOR$^2$ where R$^1$ denotes a linear or branched alkylene or al-
kenylene group, a cycloalkylene group or an arylene
group which may bear halogen atoms or nitro, alkyl or
alkoxy groups as substituents, R$^2$ denotes an alkyl, cyclo-
alkyl or aryl radical and $n$ denotes zero or 1, having a
very good herbicidal action.

The following are examples of alkylene radicals:
methylene, ethylene, propylene, butylene, dimethylmethyl-
ene, 1-propen-2'-yl-ethylene and 1(2'-methylpropen-2'-
ylethylene) radicals.

Examples of alkylene radicals are: ethenylene, pro-
penylene and butenylene radicals.

Examples of cycloalkylene radicals are: cyclopentylene,
cyclohexylene and cyclododecylene radicals.

Examples of arylene radicals are: phenylene, toluylene,
2-chlorophenylene and 2,6-dichlorophenylene radicals.

Examples of alkyl groups are: methyl, ethyl, propyl,
butyl and isobutyl groups.

Examples of cycloalkyl groups are: the cyclohexyl, cy-
clopentyl and cyclooctyl radicals.

An example of an aryl radical is phenyl which may
bear halogen atoms or methyl or nitro groups as substitu-
ents.

The compounds according to this invention are par-
ticularly selective against broadleaved and grassy weeds
in Indian corn and potato crops. The rate of application
required is from 0.5 to 2 kilograms per hectare. Applica-
tion may be before or after emergence of the crop plants.

The following are examples of active ingredients in ac-
cordance with this invention:

1-(α-carbomethoxy-α,α-dimethylacetyl)-3-isopropyl-2,4-
dioxodecahydroquinazoline;
1-(α-propen-2'-yl-β-carboethoxypropionyl)-3-isopropyl-
2,4-dioxodecahydroquinazoline;
1-(α-(2'-methylpropen-2'-yl)-β-carboethoxypropionyl)-
3-isopropyl-2,4-dioxodecahydroquinazoline;
1-(β-carboisobutyloxyacryloyl)-3-isopropyl-2,4-dioxo-
decahydroquinazoline;
1-(2'-carboethoxybenzoyl)-3-isopropyl-2,4-dioxodecahy-
droquinazoline;
1-(α-carbomethoxy-α,α-dimethylacetyl)-3-isobutyl-2,4-
dioxodecahydroquinazoline;
1-(α-propen-2'-yl-β-carboethoxypropionyl)-3-isobutyl-
2,4-dioxodecahydroquinazoline;
1-(α-methylpropen-2'-yl)-β-carboethoxypropionyl)-
3-isobutyl-2,4-dioxodecahydroquinazoline;
1-(β-carboisobutyloxyacryloyl)-3-isobutyl-2,4-dioxo-
decahydroquinazoline; and
1-(2'-carboethoxybenzoyl)-3-isobutyl-2,4-dioxohydro-
quinazoline.

The active ingredients according to the invention are
new. They may be synthesized according to the following
equation by acylation of a 3-alkyl-2,4-dioxodecahydro-
quinazoline with a hemiester chloride of a dicarboxylic
acid in the presence of a HCl acceptor.

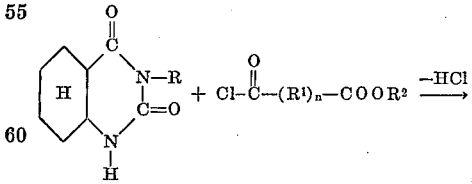

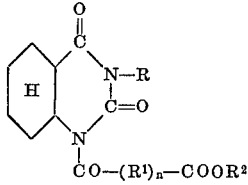

where R, R$^1$, R$^2$ and $n$ have the meanings given above.

Since all compounds to be used according to the invention can be prepared by the same method, only the production of 1-(α-carbomethoxy-α,α-dimethylacetyl)-3-isopropyl-2,4-dioxodecahydroquinazoline will now be described in detail.

21 parts by weight of 3-isopropyl-2,4-dioxodecahydroquinazoline and 12.2 parts by weight of triethylamine are dissolved in 300 parts by weight of toluene. While the reaction vessel is being cooled with ice, 18 parts by weight of the methyl ester chloride of dimethylmalonic acid is dripped into this solution at a temperature of from 10° to 15° C. To complete the reaction, the mixture is further stirred for four hours at 50° C. The triethylamine hydrochloride deposited is suction filtered. The filtrate is washed with water until neutral, dried with anhydrous sodium sulfate and concentrated in a water-jet vacuum.

30 parts of a yellowish oil remains.

*Analysis.*—Calcd. for $C_{17}H_{22}N_2O_5$ (338.42) (percent): C, 60.4; H, 7.75; N, 8.25. Found (percent): C, 60.4; H, 7.6; N, 8.1.

The infrared spectrum confirms the structure of the compound.

The new active ingredients are mostly viscous oils which can only be distilled in a high vacuum with partial decomposition. Their structure is verified by analysis and infrared spectra. Some of the new active ingredients are enumerated in the following table:

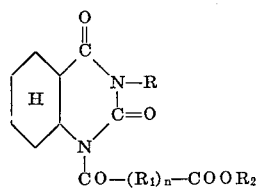

| R | $-CO(R_1)_n-COOR_2$ | $n$ | |
|---|---|---|---|
| $\mathrm{CH_3}\!\!>\!\!CH-$<br>$\mathrm{CH_3}$ | $-CO-CO-OCH_3$ | 0 | $C_{14}H_{20}N_2O_5$ (296.32)<br>Calc.: C, 56.8; H, 6.77; N, 9.45.<br>Found: C, 56.7; H, 6.7; N, 9.3. |
| $\mathrm{CH_3}\!\!>\!\!CH-$<br>$\mathrm{CH_3}$ | $-CO-\underset{\underset{CH_3}{\mid}}{\overset{\overset{CH_3}{\mid}}{C}}-COOCH_3$ | 1 | $C_{17}H_{26}H_2O_5$ (338.42)<br>Calc.:C. 60.4; H, 7.75; N, 8.25.<br>Found: C, 60.6; H, 7.8; N, 8.1. |
| $\mathrm{CH_3}\!\!>\!\!CH-$<br>$\mathrm{CH_3}$ | $-CO-CH-CH_2-CH=CH_2$<br>$\quad\mid$<br>$\quad CH_2-COOC_2H_5$ | 1 | $C_{20}H_{30}N_2O_5$ (378.46)<br>Calc.: C, 63.7; H, 7.83; N, 7.4.<br>Found: C, 63.5; H, 7.8; N, 7.3. |
| $\mathrm{CH_3}\!\!>\!\!CH-$<br>$\mathrm{CH_3}$ | $-CO-CH-CH_2-\underset{\mid}{\overset{\overset{CH_3}{\mid}}{C}}=CH_2$<br>$\quad\mid$<br>$\quad CH_2-COOC_2H_5$ | 1 | $C_{21}H_{32}N_2O_5$ (392.49)<br>Calc.: C, 64.2; H, 8.23; N, 7.13.<br>Found: C, 64.4; H, 8.1; N, 7.0. |
| $\mathrm{CH_3}\!\!>\!\!CH$<br>$\mathrm{CH_3}$ | $\mathrm{CH_3}\!\!>\!\!CH-CH_2-O-CO-\underset{\parallel}{\overset{-CO-CH}{CH}}$<br>$\mathrm{CH_3}$ | 1 | $C_{19}H_{28}N_2O_5$ (364.43)<br>Calc.: C, 62.7; H, 7.66; N, 7.76.<br>Found: C, 62.6; H, 7.7; N, 7.5. |
| $\mathrm{CH_3}\!\!>\!\!CH$<br>$\mathrm{CH_3}$ | $-CO-\!\!\!\bigcirc$<br>$C_2H_5O-CO-\!\!\!\bigcirc$ | 1 | $C_{21}H_{26}N_2O_5$ (386.44)<br>Calc.: C, 65.4; H, 6.74; N, 7.25.<br>Found: C, 65.3; H, 6.6; N, 7.4. |
| $\mathrm{CH_3}\!\!>\!\!CH-CH_2-$<br>$\mathrm{CH_3}$ | $-CO-\underset{\underset{CH_3}{\mid}}{\overset{\overset{CH_3}{\mid}}{C}}-COOCH_3$ | 1 | $C_{18}H_{28}N_2O_5$ (352.44)<br>Calc.: C, 61.4; H, 7.95; N, 7.94.<br>Found: C, 61.5; H, 7.8; N, 7.8. |
| $\mathrm{CH_3}\!\!>\!\!CH-CH_2-$<br>$CO_3$ | $-CO-CH_2-CH=CH_2$<br>$\quad\mid$<br>$\quad CH_2-CO-OC_2H_5$ | 1 | $C_{21}H_{32}N_2O_5$ (392.49)<br>Calc.: C, 64.2; H, 8.23; N, 7.13.<br>Found: C, 64.1; H, 8.4; N, 7.0. |
| $\mathrm{CH_3}\!\!>\!\!CH-CH_2$<br>$\mathrm{CH_3}$ | $-CO-CH-CH_2-\underset{\mid}{\overset{\overset{CH_3}{\mid}}{C}}=CH_2$<br>$\quad\mid$<br>$\quad CH_2-CO-OC_2H_5$ | 1 | $C_{22}H_{34}N_2O_5$ (406.51)<br>Calc.: C, 65.2; H, 8.44; N, 6.93.<br>Found: C, 65.0; H, 8.5; N, 6.8. |
| $\mathrm{CH_3}\!\!>\!\!CH-CH_2-$<br>$\mathrm{CH_3}$ | $\mathrm{CH_3}\!\!>\!\!CH-CH_2-O-CO-\underset{\parallel}{\overset{-CO-CH}{CH}}$<br>$\mathrm{CH_3}$ | ------ | $C_{20}H_{30}N_2O_5$ (378.46)<br>Calc.: C, 63.5; H, 7.94; N, 7.41.<br>Found: C, 63.0; H, 7.8; N, 7.5. |
| $\mathrm{CH_3}\!\!>\!\!CH-CH_2-$<br>$\mathrm{CH_3}$ | $-CO-\!\!\!\bigcirc$<br>$C_2H_5O-CO-\!\!\!\bigcirc$ | ------ | $C_{22}H_{28}N_2O_5$ (400.46)<br>Calc.: C, 65.6; H, 7.25; N, 6.99.<br>Found: C, 65.5; H, 7.2; N, 7.1. |

The form of application of the agents according to the invention are used depends entirely on the purpose for which they are being used. In any case it should ensure a fine distribution of the active ingredient. They may be applied as solutions, emulsions, suspensions or dusts.

A solution in water is suitable for the production of solutions capable of direct spraying. Hydrocarbons such as tetrahydronaphthalene and alkylated naphthalenes may however also be used as vehicles for spraying.

Aqueous formulations may be prepared from emulsion concentrates, pastes or wettable powders by adding water. To prepare emulsions, the ingredients as such or dissolved in a solvent may be homogenized in water or an organic solvent by means of a wetting or dispersing agent. It is however also possible to prepare concentrates consisting of active ingredient, emulsifying or dispersing agent and possibly solvent; these concentrates are suitable for dilution with water. Dusts can be prepared by mixing or grinding the active ingredient with a solid carrier, for example diatomaceous earth, infusorial earth, clay or fertilizer.

Mixing with other herbicides is also possible and also the common application with fertilizers.

The following examples explain the effect of the new compounds.

EXAMPLE 1

Loamy sandy soil which has been sown with Indian corn (*Zea mays*), potatoes (*Solanum tuberosum*), wild mustard (*Sinapis arvensis*), white goosefoot (*Chenopodium album*), small nettle (*Urtica urens*), annual rye grass (*Poa annua*) and barnyard grass (*Echinochloa crusgalli*) is treated with 1.5 kg. of 1-(α-carbomethoxy-α,α-dimethylacetyl)-3-isopropyl-2,4-dioxodecahydroquinazoline dispersed in 500 liters of water per hectare. After three to four weeks it is evident that the plants wild mustard, white goosefoot, small nettle, annual rye grass and barnyard grass are almost completely withered, while Indian corn exhibits only a slight inhibition of growth and the potatoes exhibit no damage.

EXAMPLE 2

The plants Indian corn (*Zea mays*), white goosefoot (*Chenopodium album*), wild mustard (*Sinapis arvensis*), small nettle (*Urtica urens*), chickweed (*Stellaria media*), annual rye grass (*Poa annua*), slender foxtail (*Alopecurus myosuroides*) and barnyard grass (*Echinochloa crusgalli*) are treated at a growth height of 3 to 12 cm. with 1-(α-carbomethoxy-α,α-dimethylacetyl-3-isopropyl-2,4-dioxodecahydroquinazoline (I) and with the known potassium salt of 2-methyl-4-chlorophenoxy acetic acid (II) for comparison, each at the rate of 1.5 kg. of active ingredient dispersed in or dissolved in 500 liters of water per hectare.

Three to four weeks later the results shown in the following table are obtained:

|  | Active ingredient | |
|---|---|---|
|  | (I) | (II) |
| Indian corn | 0 | 30. |
| White goosefoot | 90 to 100 | 90 to 100. |
| Wild mustard | 90 to 100 | 90. |
| Small nettle | 90 to 100 | 90 to 100. |
| Chickweed | 90 | 20. |
| Annual rye grass | 90 | 0 to 10. |
| Slender foxtail | 90 | 10. |
| Barnyard grass | 90 to 100 | 0. |

0 = No damage.   100 = Total destruction.

The herbicidal ingredients according to this invention may also be used as total herbicides by using higher rates of application.

The substances listed below (ddh = dioxodecahydroquinazoline) have the same effect as (I) in Examples 1 and 2:

1-(α-propen-2'-yl-β-carboethoxypropionyl)-3-isopropyl-2,4-ddh
1-(α-(2'-methylpropen-2'-yl)-β-carboethoxypropionyl)-3-isopropyl-2,4-ddh
1-(β-carboisobutyloxyacryloyl)-3-isopropyl-2,4-ddh
1-(2'-carboethoxybenzoyl)-3-isopropyl-2,4-ddh
1-(α-carbomethoxy-α,α-dimethylacetyl)-3-isobutyl-2,4-ddh
1-(α-propen-2'-yl-β-carboethoxypropionyl)-3-isobutyl-2,4-ddh
1-(α-(2'-methylpropen-2'-yl)-β-carboethoxypropionyl)-3-isobutyl-2,4-ddh
1-(β-carboisobutylacryloyl)-3-isobutyl-2,4-ddh
1-(2'-carboethoxybenzoyl)-3-isobutyl-2,4-ddh and
1-carbomethoxycarbonyl-3-isopropyl-2,4-dioxodecahydroquinazoline.

We claim:

1. A 2,4-dioxodecahydroquinazoline having the formula

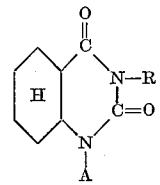

where R denotes an alkyl radical of two to four carbon atoms and A denotes the radical —CO—($R^1$)$_n$—COOR$^2$ where $R^1$ denotes methylene, ethylene, propylene, butylene, dimethylmethylene, 1-propen-2'-yl-ethylene, 1-(2'-methylpropen-2'-yl)ethylene), ethnylene, propenylene, butenylene phenylene, toluylene, 2-chlorophenylene, and 2,6-dichlorophenylene, $R^2$ denotes methyl, ethyl, propyl, butyl and isobutyl, and $n$ denotes zero or 1.

2. 1-(α-propen-2'-yl-β-carboethoxypropionyl)-3-isopropyl-2,4-dioxodecahydroquinazoline.

3. 1-(α-carbomethoxy-α,α-dimethylacetyl)-3-isopropyl-2,4-dioxodecahydroquinazoline.

References Cited

UNITED STATES PATENTS 3,235,363   2/1966   Luckenbaugh et al. ___ 260—260

ALEX MAZEL, Primary Examiner

A. M. TIGHE, Assistant Examiner

U.S. Cl. X.R.

71—92

UNITED STATES PATENT OFFICE
CERTIFICATE OF CORRECTION

Patent No. 3,503,978                          Dated March 31, 1970

Inventor(s) Adolf Zeidler et al

It is certified that error appears in the above-identified patent and that said Letters Patent are hereby corrected as shown below:

Column 1, line 32, "alkyl-" should read --alkenyl- --.

Column 2, line 7, "alkylene" should read --alkenylene--; line 46, "dioxohydro-" should read -- dioxodecahydro- --.

Column 4, in the table, 8th entry, second column, $$\text{"-CO-CH}_2\text{-CH=CH}_2\text{"} \atop \phantom{\text{"-CO-}}\text{CH}_2\text{-CO-OC}_2\text{H}_5 \quad \text{should read} \quad \text{-CO-CH-CH}_2\text{-CH=CH}_2 \atop \phantom{\text{-CO-}}\text{CH}_2\text{-CO-OC}_2\text{H}_5$$

SIGNED AND SEALED

JUL 21 1970

(SEAL)
Attest:

Edward M. Fletcher, Jr.
Attesting Officer

WILLIAM E. SCHUYLER, JR.
Commissioner of Patents